(12) United States Patent
Ishiguro

(10) Patent No.: US 8,375,298 B2
(45) Date of Patent: Feb. 12, 2013

(54) METHOD AND APPARATUS FOR PROCESSING LAYOUT AND STORAGE MEDIUM

(75) Inventor: Taisuke Ishiguro, Kamagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 12/560,979

(22) Filed: Sep. 16, 2009

(65) Prior Publication Data

US 2010/0169767 A1 Jul. 1, 2010

(30) Foreign Application Priority Data

Sep. 18, 2008 (JP) ................. 2008-239441

(51) Int. Cl.
*G06F 17/00* (2006.01)

(52) U.S. Cl. ....... 715/253; 715/243; 715/246; 358/1.18; 382/286

(58) Field of Classification Search .......... 715/243–253; 382/284

See application file for complete search history.

(56) References Cited

U.S. PATENT DOCUMENTS

| | | | |
|---|---|---|---|
| 6,004,061 A * | 12/1999 | Manico et al. ................. 402/79 |
| 6,826,727 B1 * | 11/2004 | Mohr et al. ................... 715/235 |
| 7,340,676 B2 * | 3/2008 | Geigel et al. ................. 715/716 |
| 7,369,164 B2 * | 5/2008 | Parulski et al. .......... 348/231.99 |
| 7,474,801 B2 * | 1/2009 | Teo et al. ...................... 382/284 |
| 7,489,324 B2 * | 2/2009 | Royal et al. .................. 345/667 |
| 7,548,334 B2 * | 6/2009 | Lo et al. ....................... 358/1.15 |
| 7,554,689 B2 * | 6/2009 | Tonisson ...................... 358/1.18 |
| 7,743,322 B2 * | 6/2010 | Atkins .......................... 715/243 |
| 7,761,791 B2 * | 7/2010 | Kobashi et al. .............. 715/253 |
| 8,055,080 B2 * | 11/2011 | Isomura et al. .............. 382/224 |
| 2002/0040375 A1 * | 4/2002 | Simon et al. ................. 707/517 |
| 2002/0103813 A1 * | 8/2002 | Frigon ...................... 707/104.1 |
| 2002/0122067 A1 * | 9/2002 | Geigel et al. ................. 345/788 |
| 2003/0117651 A1 * | 6/2003 | Matraszek et al. ........... 358/1.18 |
| 2003/0122839 A1 * | 7/2003 | Matraszek et al. ........... 345/581 |
| 2004/0201752 A1 * | 10/2004 | Parulski et al. .......... 348/231.99 |
| 2005/0128518 A1 * | 6/2005 | Tsue et al. .................... 358/1.15 |
| 2005/0179947 A1 * | 8/2005 | Kobashi et al. .............. 358/1.18 |
| 2005/0223320 A1 * | 10/2005 | Brintzenhofe et al. ....... 715/517 |
| 2006/0029125 A1 * | 2/2006 | Kobashi et al. .............. 375/222 |
| 2006/0220983 A1 * | 10/2006 | Isomura et al. ............... 345/1.1 |
| 2006/0255986 A1 * | 11/2006 | Takanezawa et al. .......... 341/67 |
| 2007/0055690 A1 * | 3/2007 | Giannetti ..................... 707/102 |
| 2007/0055925 A1 * | 3/2007 | Giannetti ..................... 715/511 |
| 2007/0055929 A1 * | 3/2007 | Giannetti et al. ............. 715/517 |
| 2008/0089590 A1 * | 4/2008 | Isomura et al. .............. 382/217 |
| 2008/0094420 A1 * | 4/2008 | Geigel et al. ................. 345/660 |
| 2008/0155394 A1 * | 6/2008 | Sellman et al. .............. 715/235 |
| 2008/0260289 A1 * | 10/2008 | Hara et al. ................... 382/294 |
| 2008/0309795 A1 * | 12/2008 | Mitsuhashi et al. ..... 348/231.99 |
| 2009/0146994 A1 * | 6/2009 | Goh ............................. 345/418 |
| 2010/0007788 A1 * | 1/2010 | Lee et al. ..................... 348/445 |

FOREIGN PATENT DOCUMENTS

| | | |
|---|---|---|
| JP | 2007-122487 A | 5/2007 |
| JP | 2007-272428 A | 10/2007 |

* cited by examiner

*Primary Examiner* — Doug Hutton, Jr.
*Assistant Examiner* — Benjamin Smith
(74) *Attorney, Agent, or Firm* — Canon USA, Inc., IP Division

(57) ABSTRACT

A plurality of other contents are placed in one content placement region so that a priority content to which a priority attribute is set is displayed larger than the other contents to which the priority attribute is not set.

9 Claims, 20 Drawing Sheets

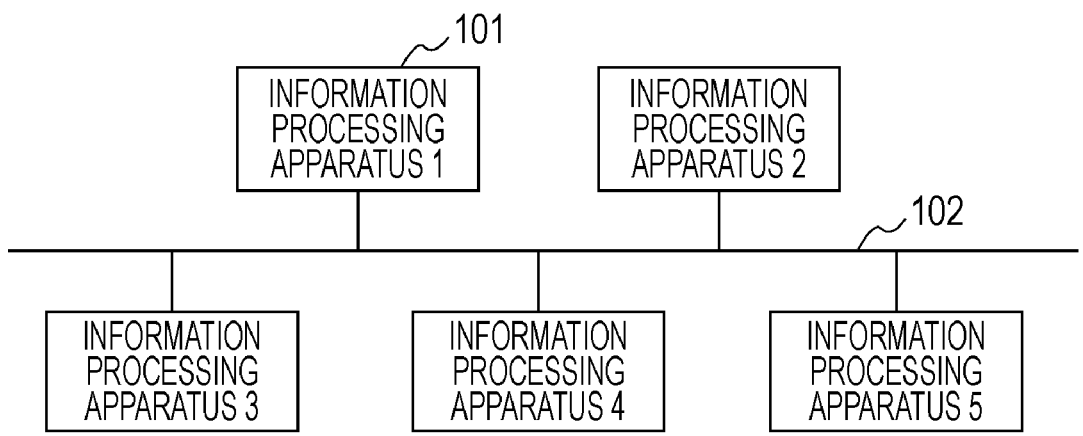
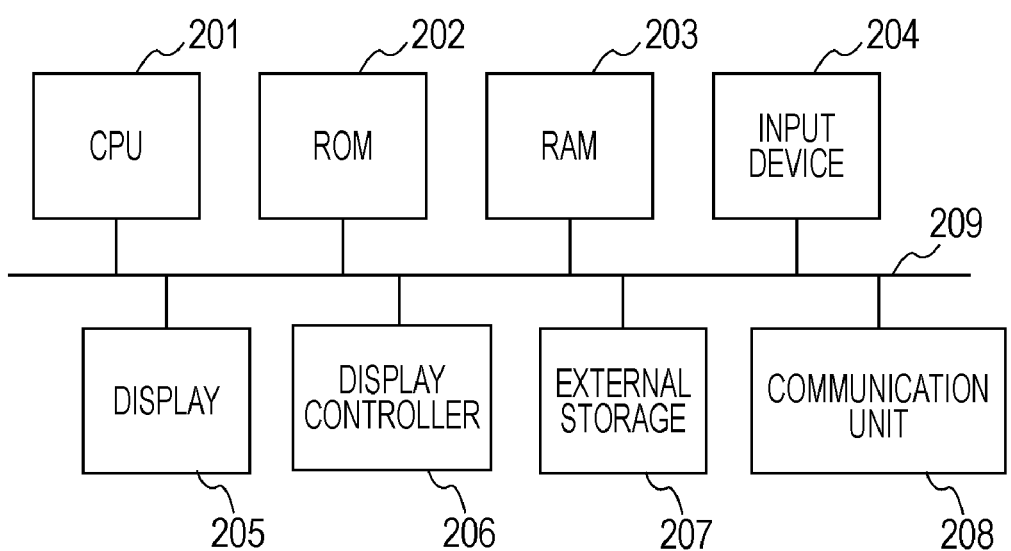

FIG. 8
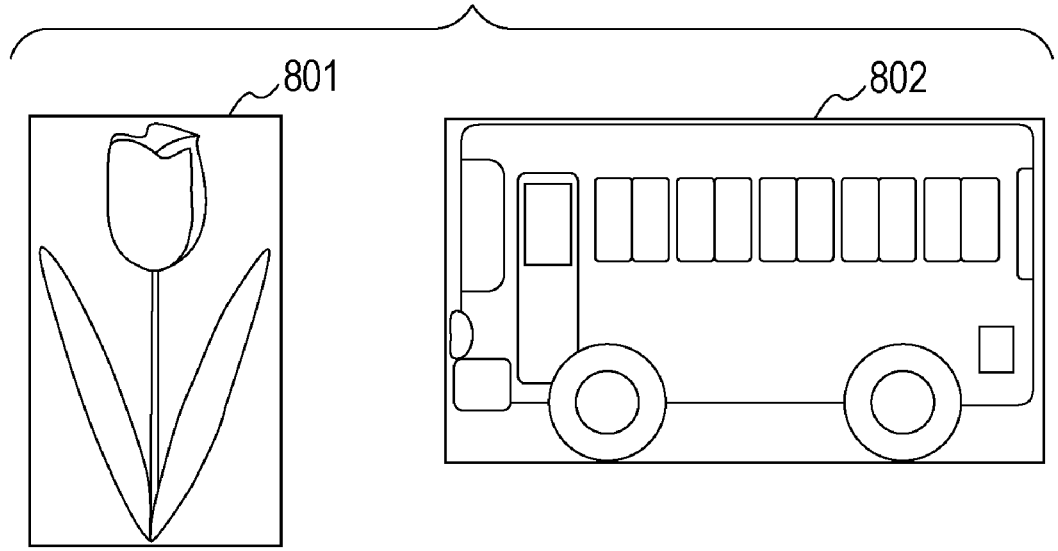
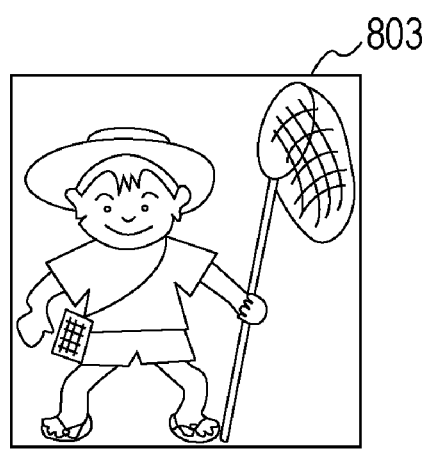

FIG. 18

| TABLE ID (1801) | REGION NO. (1802) | CORRESPONDING CONTENT NO. (1803) |
|---|---|---|
| 1 | 1 | |
| | 2 | |
| | 3 | |

FIG. 19

| NUMBER OF CONTENTS (1901) | TEMPLATE ID (1902) |
|---|---|
| 1 | 1, 3, 4, 10, ··· |
| 2 | 2, 5, 7, ··· |
| 3 | 6, 11, 13, 15, ··· |

FIG. 20

| CONTENT NO. 2001 | WIDTH 2002 | HEIGHT 2003 | PRIORITY ATTRIBUTE 2004 | DATA PATH 2005 |
|---|---|---|---|---|
| 1 | W1 | H1 | 1 | ... |
| 2 | W2 | H2 | 0 | ... |
| 3 | W3 | H3 | 0 | ... |
| 4 | W4 | H4 | 0 | ... |
| 5 | W5 | H5 | 0 | ... |
| 6 | W6 | H6 | 0 | ... |
| 7 | W7 | H7 | 0 | ... |
| 8 | W8 | H8 | 0 | ... |
| 9 | W9 | H9 | 0 | ... |

FIG. 21

| TEMPLATE ID 2101 | ASSOCIATION TABLE ID 2102 | PROCESS END FLAG 2103 |
|---|---|---|
| 1 | | |
| 2 | | |
| 3 | | |

FIG. 24

| TABLE ID | REGION NO. | CORRESPONDING CONTENT NO. |
|---|---|---|
| 1 | 1 | 1 |
|   | 2 |   |
|   | 3 |   |

FIG. 25

| TABLE ID | REGION NO. | CORRESPONDING CONTENT NO. |
|---|---|---|
| 1 | 1 | 1 |
|   | 2 | 4, 7, 3 |
|   | 3 | 8, 2, 5, 6, 9 |

METHOD AND APPARATUS FOR PROCESSING LAYOUT AND STORAGE MEDIUM

BACKGROUND OF THE INVENTION

1. Field of the Invention

The present invention relates to a method for associating layout contents with templates in accordance with the priority levels (priority attributes) of the contents.

2. Description of the Related Art

Known examples of document layout processing technology include a technology for automatically laying out the contents of a document in a template in accordance with predetermined layout rules.

The automatic layout technology executes a layout process by using contents and a template having content placement regions and associating the contents with the content placement regions.

Such an automatic layout technology is utilized by a system typified by a variable print system and is broadly used in the field of one-to-one marketing.

One of the objects of the automatic layout technology is to create documents customized for individual customers to respond to customer needs. To achieve this object, a technology of setting priority levels to a template in the automatic layout process. This technology allows a content to be placed in a content placement region given priority to be displayed larger than that placed in the other content placement regions (Japanese Patent Laid-Open No. 2007-122487).

However, for the above-described known layout process using priority, it is necessary that the template and the contents are associated. Therefore, in a situation in which the association of a template and contents cannot be made in advance, a layout process using priority cannot be made. Examples of the situation in which the association of a template and contents cannot be made in advance include a case in which a large number of templates are used and a case in which a template is automatically generated.

The use of a large number of templates is used to present a large number of layout results. The automatic generation of a template is often adopted to prevent storage of a large number of templates or to generate much more layout results. In other words, to present a large number of layout results or to automatically generate a template, it is difficult to perform a layout process utilizing priority setting.

SUMMARY OF THE INVENTION

The present invention easily achieves a layout process using priority.

The present invention provides a method for executing a layout process using a template having a plurality of content placement regions and contents to be placed in the content placement regions. The method includes a setting step of setting at least one content a priority attribute indicating that the content is larger in size than the other contents; a first selecting step of selecting one content placement region in which the plurality of other contents to which the priority attribute is not set are to be placed from the plurality of content placement regions; a first placing step of placing the plurality of other contents in the one content placement region selected in the first selecting step, without changing the aspect ratios of the plurality of other contents, in the placement direction set for the content placement region; a second selecting step of selecting a priority-content placement region different from the content placement region selected in the first selecting step so that the priority content to which the priority attribute is set is larger in size than the other contents; and a second placing step of placing the priority content in the one content placement region selected in the first selecting step without changing the aspect ratio thereof.

Further features of the present invention will become apparent from the following description of exemplary embodiments with reference to the attached drawings.

BRIEF DESCRIPTION OF THE DRAWINGS

FIG. 1 is a diagram showing a network system configuration according to an embodiment of the present invention.

FIG. 2 is a diagram showing an apparatus configuration according to the embodiment of the present invention.

FIG. 8 is a diagram showing examples of content data according to the embodiment of the present invention.

FIG. 18 is a diagram showing an example of an association table according to the embodiment of the present invention.

FIG. 19 is a diagram showing an example of a template table according to the embodiment of the present invention.

FIG. 20 is a diagram showing an example of a content data table according to the embodiment of the present invention.

FIG. 21 is a diagram showing an example of a template management table according to the embodiment of the present invention.

FIG. 24 is a diagram showing an example of an association table according to the embodiment of the present invention.

FIG. 25 is a diagram showing an example of the association table according to the embodiment of the present invention.

DESCRIPTION OF THE EMBODIMENT

Figure 3:
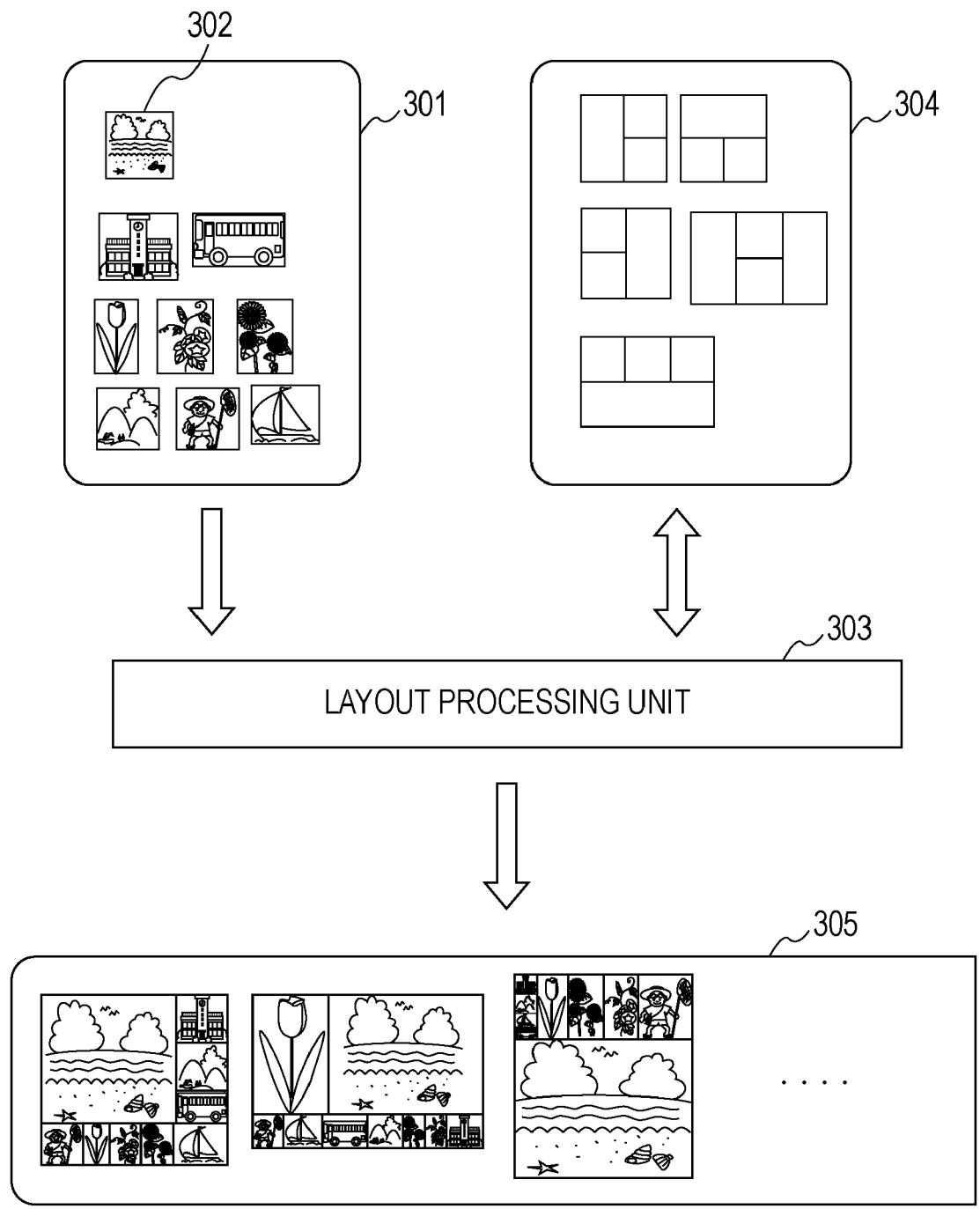
FIG. 3 is a diagram illustrating the outline of a layout process according to the embodiment of the present invention.

An embodiment of the present invention will be described herein below in detail.

FIG. 1 is a diagram showing a network system constituted of information processing apparatuses according to an embodiment of the present invention. The network system includes a plurality of information processing apparatuses connected over a network 102 serving as a transmission medium for various data. The network 102 may be a local area network (LAN), such as Ethernet (a trademark), or a wide-area information network, such as the Internet. The information processing apparatuses 1 to 5 are connected together via a communication apparatus 208 to be described later in FIG. 2.

FIG. 2 is a diagram showing the hardware configuration of an information processing apparatus according to the embodiment of the present invention.

A microprocessor central processing unit (CPU) 201 performs operations, logical decision, etc. for various processes and controls the components through a bus 209.

A permanent read only memory (ROM) 202 stores program codes of a layout control program etc. to be executed.

A writable random access memory (RAM) 203 is used to temporarily store various data from the components.

An input device 204 corresponds to a mouse, a keyboard, etc. used for inputting information (data).

Reference numeral 205 denotes a display, such as a CRT or a liquid crystal panel. A display controller 206 controls the display of dot display patterns and a cursor.

An external storage 207 stores various information. Examples of the storage medium to store such data and programs are a ROM, a CD-ROM, a DVD-ROM, etc.

A communication unit 208 connects to a network, such as Ethernet, to connect the plurality of information processing apparatuses in the network system.

The information processing apparatuses made up of such components operate in accordance with input from the input device 204 or input over a network provided by the communication apparatus 208. When the input from the input device 204 or the input from the communication apparatus 208 is provided, an interrupt signal is sent to the CPU 201. The CPU 201 reads various control signals stored in the external storage 207 and performs various controls in accordance with the control signals.

The present invention can also be achieved such that a storage medium that stores a layout control program according to an embodiment of the present invention read is provided to a system or apparatus, and the computer of the system or apparatus executes the program code stored in the storage medium.

FIG. 3 is a diagram illustrating the outline of a layout process according to this embodiment.

Reference numeral 301 denotes a group of layout contents. Reference numeral 302 denotes a content given priority (priority attribute) among the group of contents. The priority is designated by the user. The content given the priority (priority attribute) is displayed larger than contents given no priority. In the present application, the content given priority is defined as a priority content.

A layout processing apparatus 303 performs a layout process using the contents 301 and templates 304. Reference numeral 305 denotes the results of layout performed by the layout processing apparatus 303.

The content 302 given the priority attribute is displayed larger than the other contents in the layout results 305. The user selects a desired layout result from the plurality of layout results 305 and prints or stores it.

Figure 4:
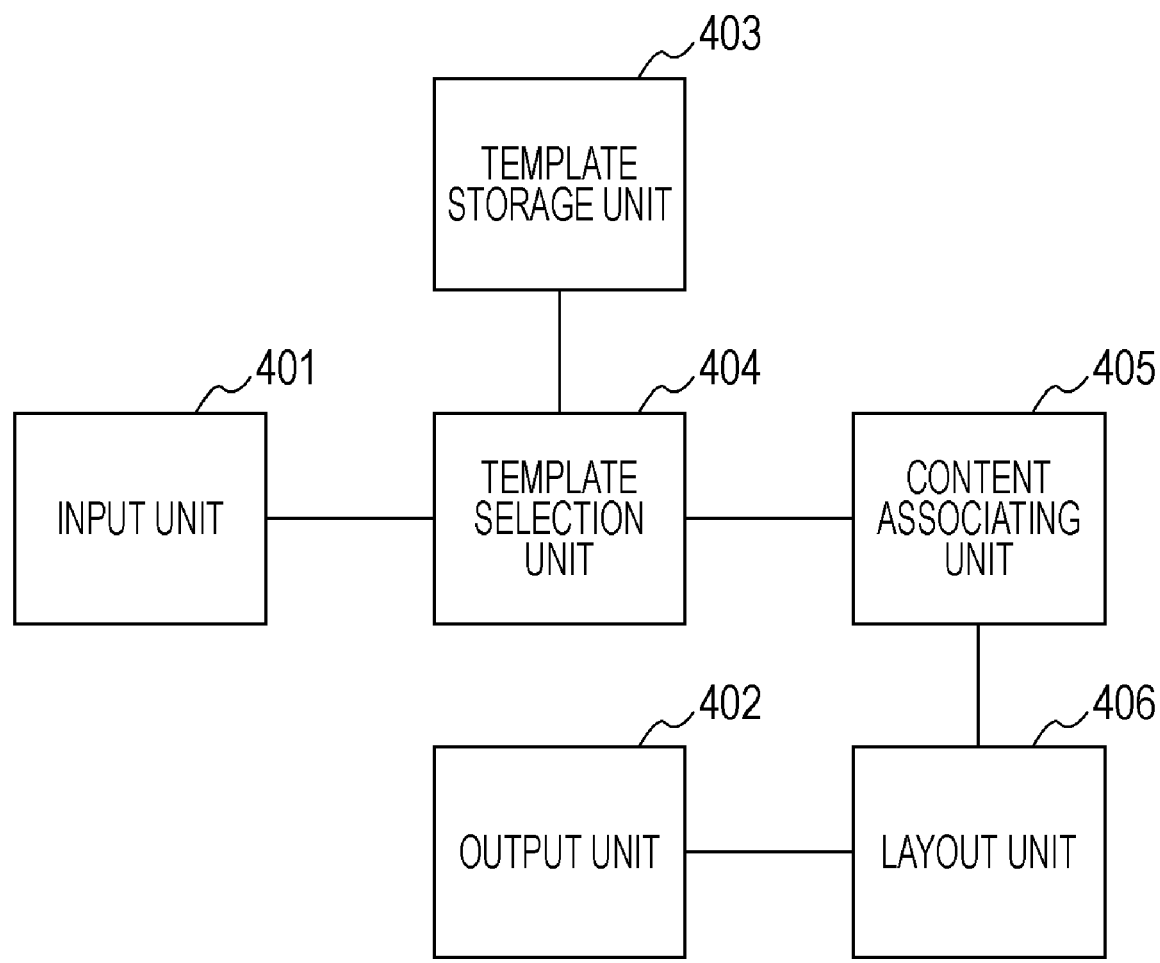
FIG. 4 is a functional block diagram of the embodiment of the present invention.

FIG. 4 is a functional block diagram of this embodiment. As shown in FIG. 4, the layout processing apparatus 303 includes an input unit 401, an output unit 402, a template storage unit 403, a template selection unit 404, a content associating unit 405, and a layout unit 406.

The input unit 401 receives user's operating instructions, such as designation of a content, setting of a priority attribute, and selection of a layout, and input of various data, such as contents.

The output unit 402 displays the results of layout, a mouse pointer for a user instruction, etc.

The template storage unit 403 stores templates. The templates will be described later with reference to FIG. 6.

The template selection unit 404 selects a template from the template storage unit 403. The selection of a template is performed depending on the number of contents.

The correspondence between the number of contents and templates is defined on a template table shown in FIG. 19, for example.

The content associating unit 405 associates a template selected by the template selection unit 404 and a content designated by the input unit 401.

The process of the content associating unit 405 will be described with reference to FIG. 17.

The layout unit 406 performs a layout process on the basis of the template selected by the template selection unit 404 and the content associated by the content associating unit 405. The outline of the layout process will be described with reference to FIGS. 7 to 16.

The processes of the above-described units are achieved by the CPU 201.

Figure 5:
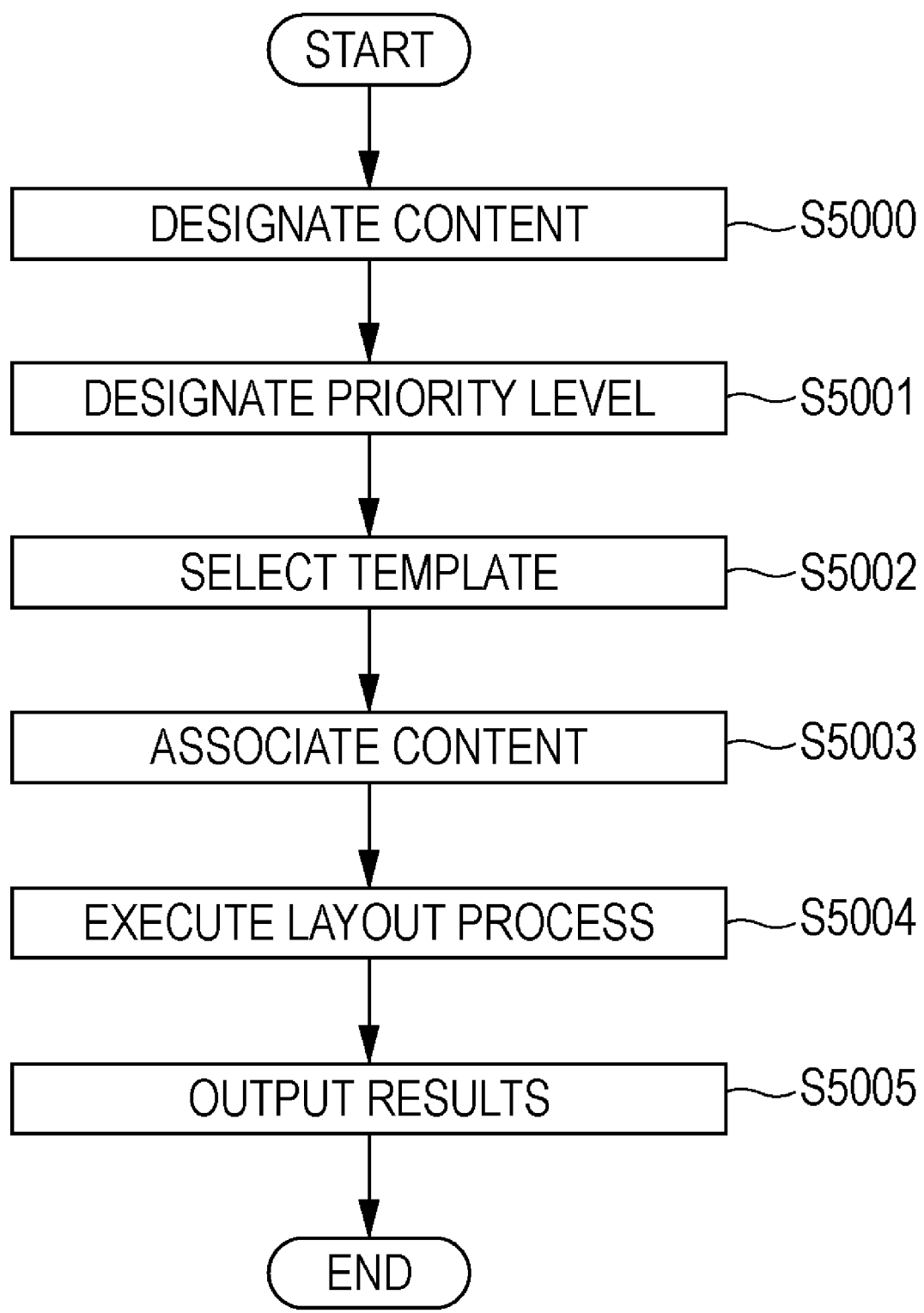
FIG. 5 is a flowchart showing the outline of the overall process according to the embodiment of the present invention.

FIG. 5 is a flowchart showing the outline of the process of this embodiment. The steps of the flowchart of the present application are achieved by the CPU 201 reading a program for executing the flowchart from a memory and executing it.

In step S5000, the input unit 401 designates a layout target content. Data related to the designated content is stored in a content-data table. The content-data table will be described with reference to FIG. 20.

In step S5001, the input unit 401 sets a priority attribute to the content designated in step S5000. The result of setting is reflected to the content-data table in FIG. 20.

In step S5002, the template selection unit 404 selects a template for performing a layout process.

In step S5003, the content associating unit 405 associates the content designated in step S5000 with the template selected in step S5002. The details of the content associating process will be described with reference to FIG. 17.

In step S5004, the layout unit 406 executes a layout process on the basis of information on the template-content association executed in step S5003.

In step S5005, the output unit (display control unit) 402 outputs (displays) the results of the layout process in step S5004. An example of the results of the process in step S5005 is the layout results 305 in FIG. 3.

After step S5005, the input unit 401 selects a layout result from the layout results in step 5005 in accordance with user's instruction and outputs it, such as printing.

Figure 6:
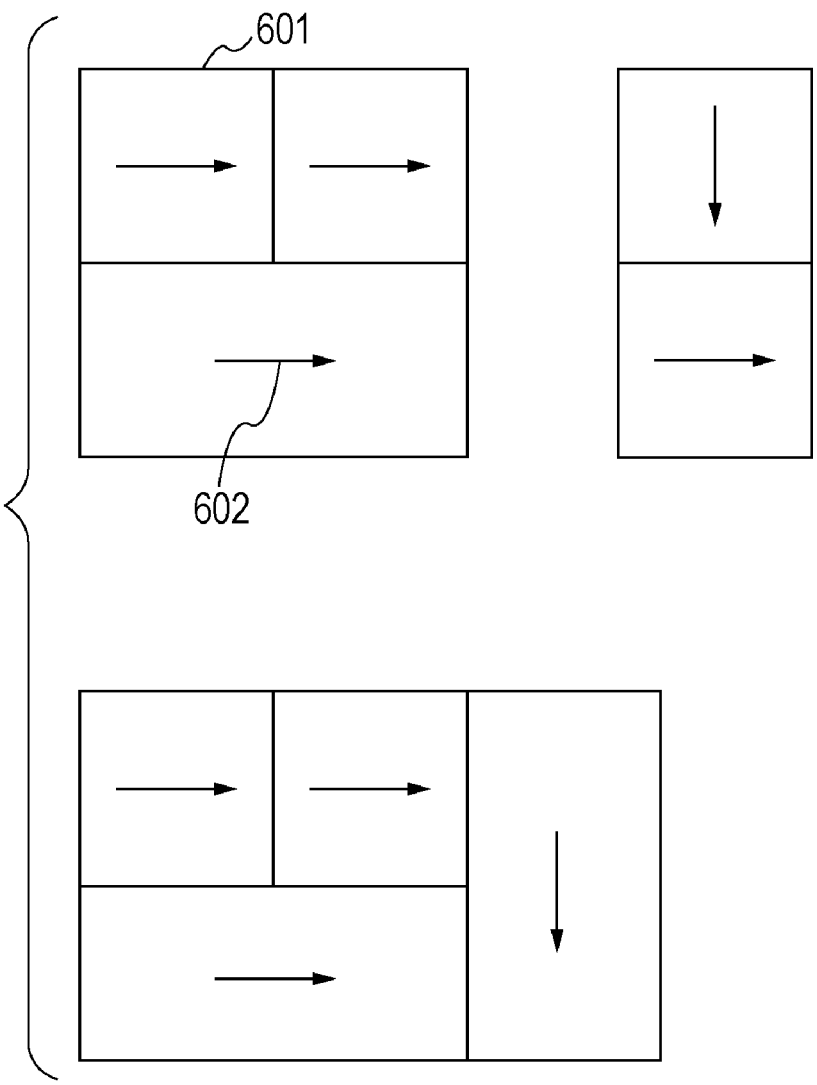
FIG. 6 is a diagram showing examples of a template according to the embodiment of the present invention.

FIG. 6 is a diagram showing examples of the template of this embodiment. The templates shown in FIG. 6 are composed of a plurality of content placement regions 601; however, it may include only one content placement region.

As shown in FIG. 6, various templates can be defined depending on the combination of the content placement regions 601.

In the content placement regions 601, a plurality of contents can be placed, in which directions in which the contents are placed (content placement directions 602) are defined.

Next, the outline of the layout process will be described with reference to FIGS. 7 to 16.

The layout process of this embodiment places contents in content placement regions in such a manner as to keep an aspect ratio of the contents without space.

Figure 7:
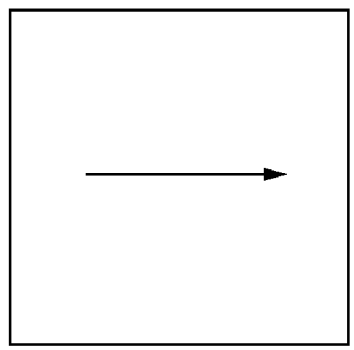
FIG. 7 is a diagram showing an example of a template according to the embodiment of the present invention.

Concrete examples of the layout results obtained by the layout process using the template in FIG. 7 and the contents in FIG. 8 will be illustrated.

Figure 9A:
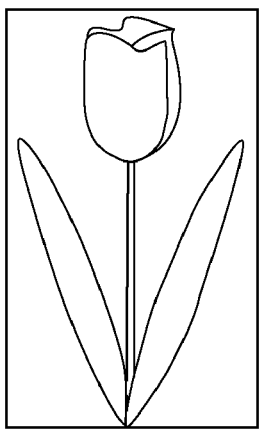
FIGS. 9A and 9B show examples of a layout result according to the embodiment of the present invention.
Figure 9B:
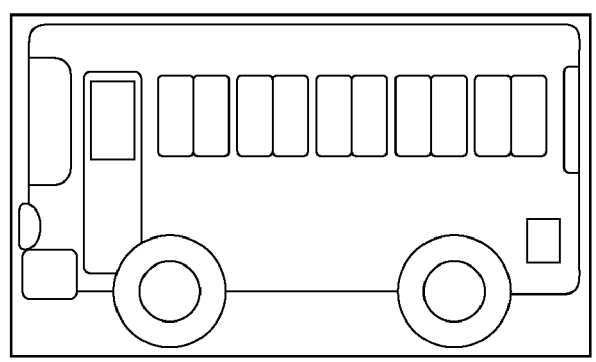

In the case where contents 801 and 802 in FIG. 8 are individually placed in the template in FIG. 7, the layout results are as shown in FIGS. 9A and 9B. FIGS. 9A and 9B show that the content placement region of the template is changed in accordance with the aspect ratios of the contents 801 and 802.

Figure 10:
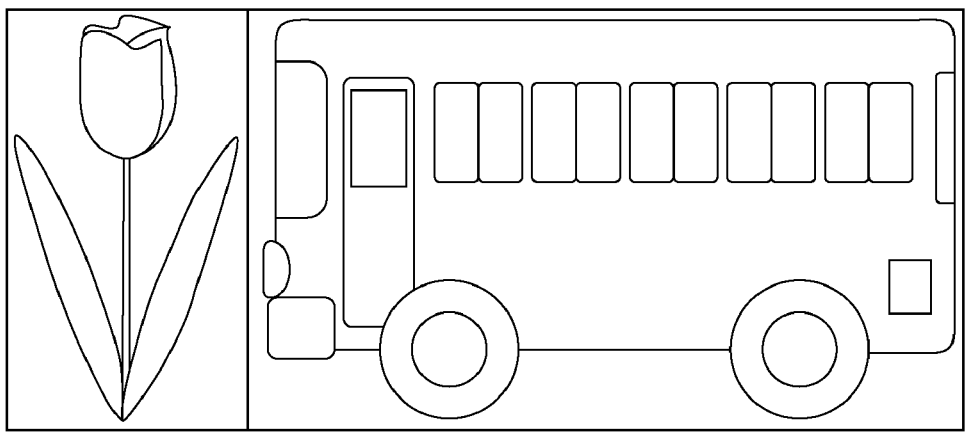
FIG. 10 is a diagram showing an example of a layout result according to the embodiment of the present invention.

On the other hand, in the case where the content 801 and the content 802 are placed in the content placement region of the template in FIG. 7, the layout result shown in FIG. 10 is given. FIG. 10 shows that the aspect ratios of the two contents 801 and 802 are kept.

Figure 11:
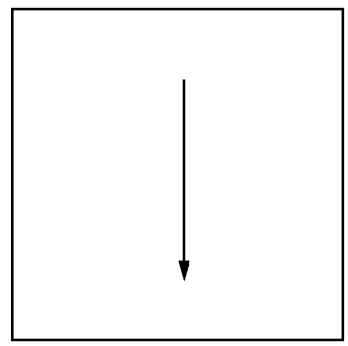
FIG. 11 is a diagram showing an example of a template according to the embodiment of the present invention.
Figure 12:
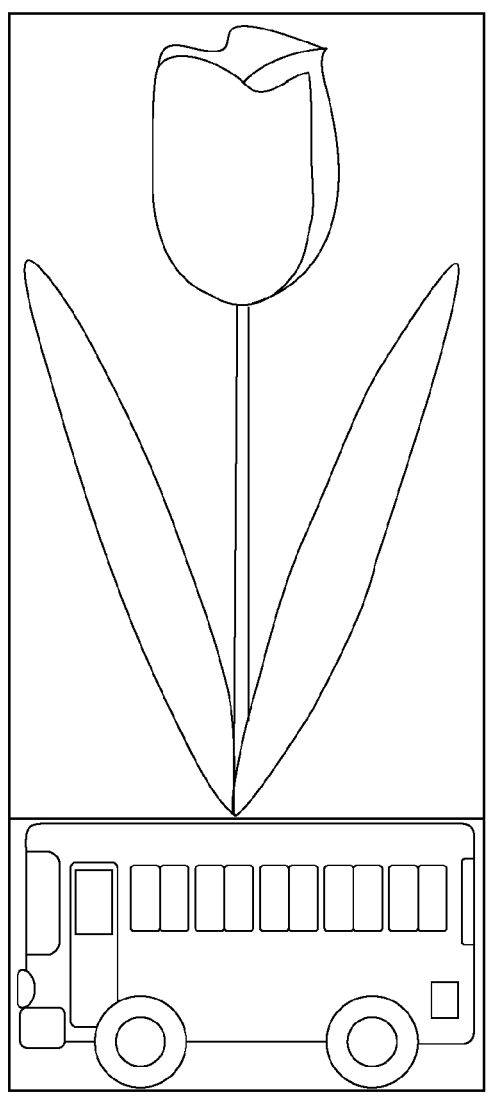
FIG. 12 is a diagram showing an example of a layout result according to the embodiment of the present invention.

In the case where the content 801 and the content 802 are placed in the template in FIG. 11 whose content placement direction is different from the template in FIG. 7, the layout result shown ion FIG. 12 is given. The aspect ratios of the located contents are kept irrespective of the content placement direction. The lateral size of a content placement region whose the content placement direction is vertical corresponds to the lateral size of content data that is first placed in the content placement region. That is, in FIG. 12, the lateral size of the content 801 corresponds to the lateral size of the content placement region in FIG. 12. On the other hand, the vertical size of a content placement region whose content placement direction is lateral corresponds to the vertical size of content data that is first placed in the content placement region.

Figure 13:
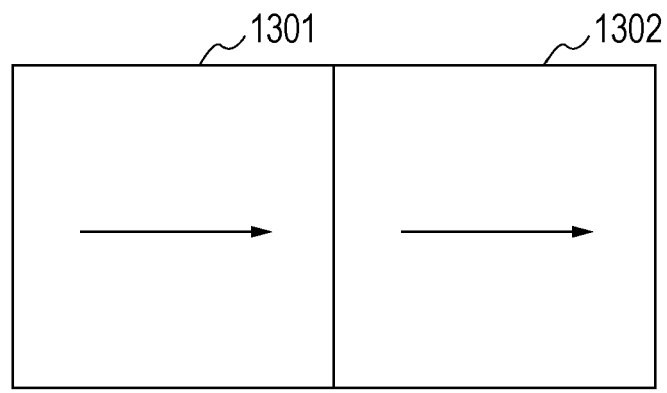
FIG. 13 is a diagram showing an example of a template according to the embodiment of the present invention.

FIG. 13 shows an example of a template constructed of a plurality of content placement regions.

Figure 14:
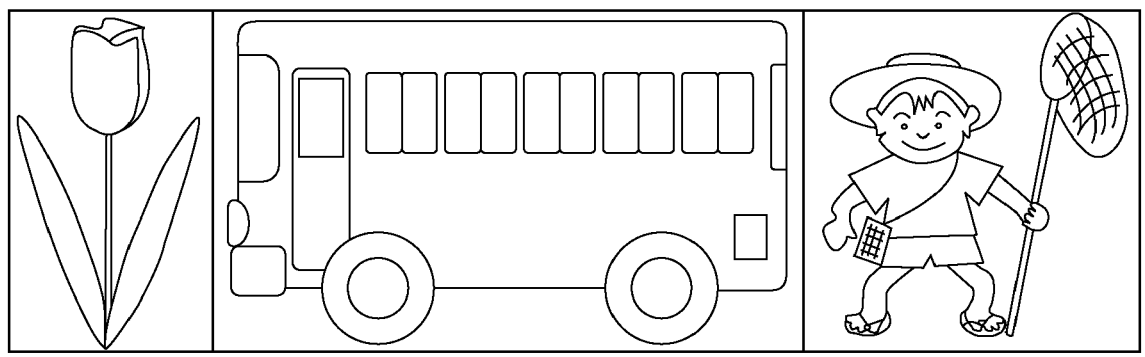
FIG. 14 is a diagram showing an example of a layout result according to the embodiment of the present invention.

In the case where the content 801 and the content 802 are placed in a content placement region 1301, and a content 803 is placed in a content placement region 1302, they are placed such that the aspect ratios of the contents are kept, so that the layout result in FIG. 14 is given.

Figure 15:
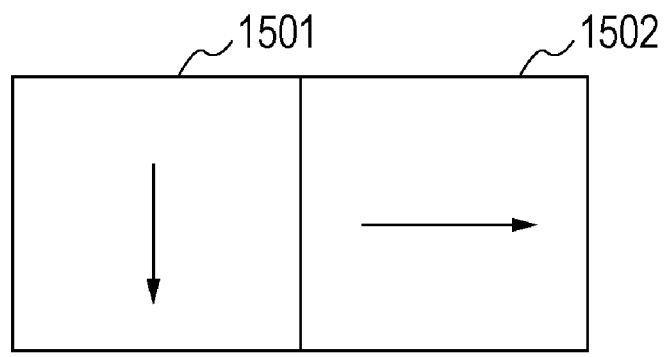
FIG. 15 is a diagram showing an example of a template according to the embodiment of the present invention.
Figure 16:
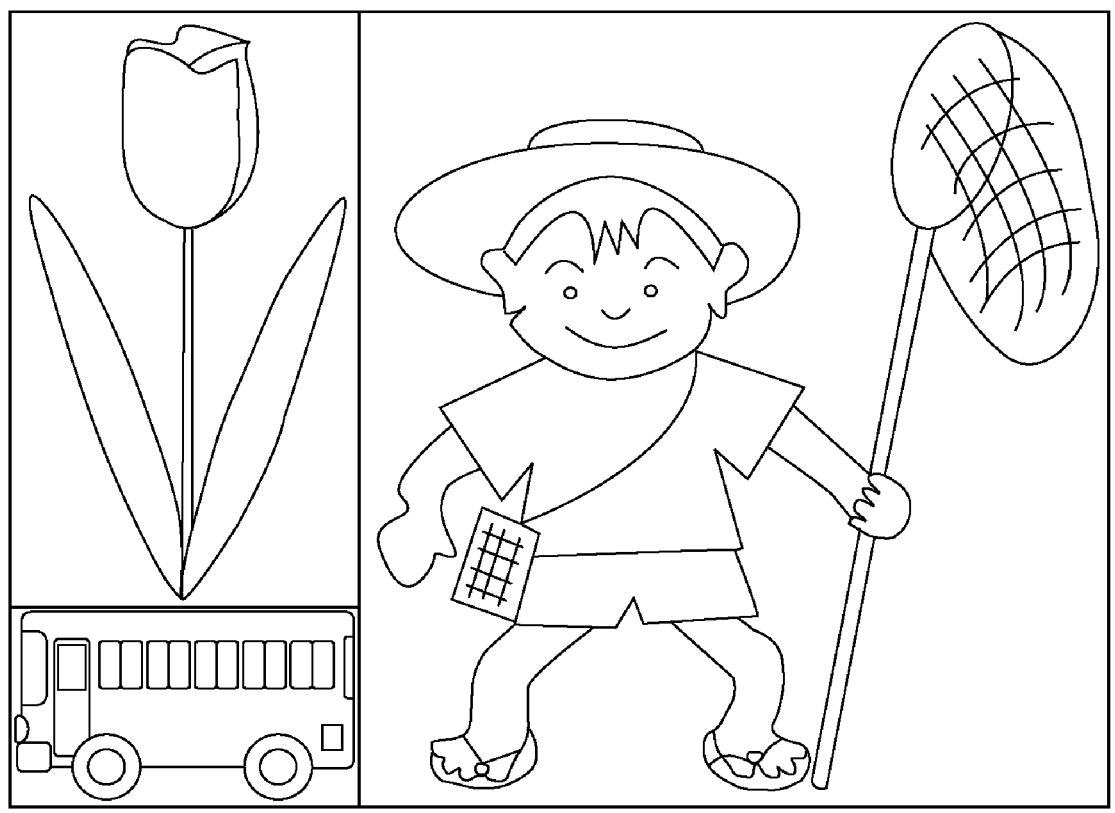
FIG. 16 is a diagram showing an example of a layout result according to the embodiment of the present invention.

On the other hand, FIG. 16 shows the layout result of the case where the content 801 and the content 802 are placed in a content placement region 1501 of the template in FIG. 15, and the content 803 is placed in a content placement region 1502.

Figure 17:
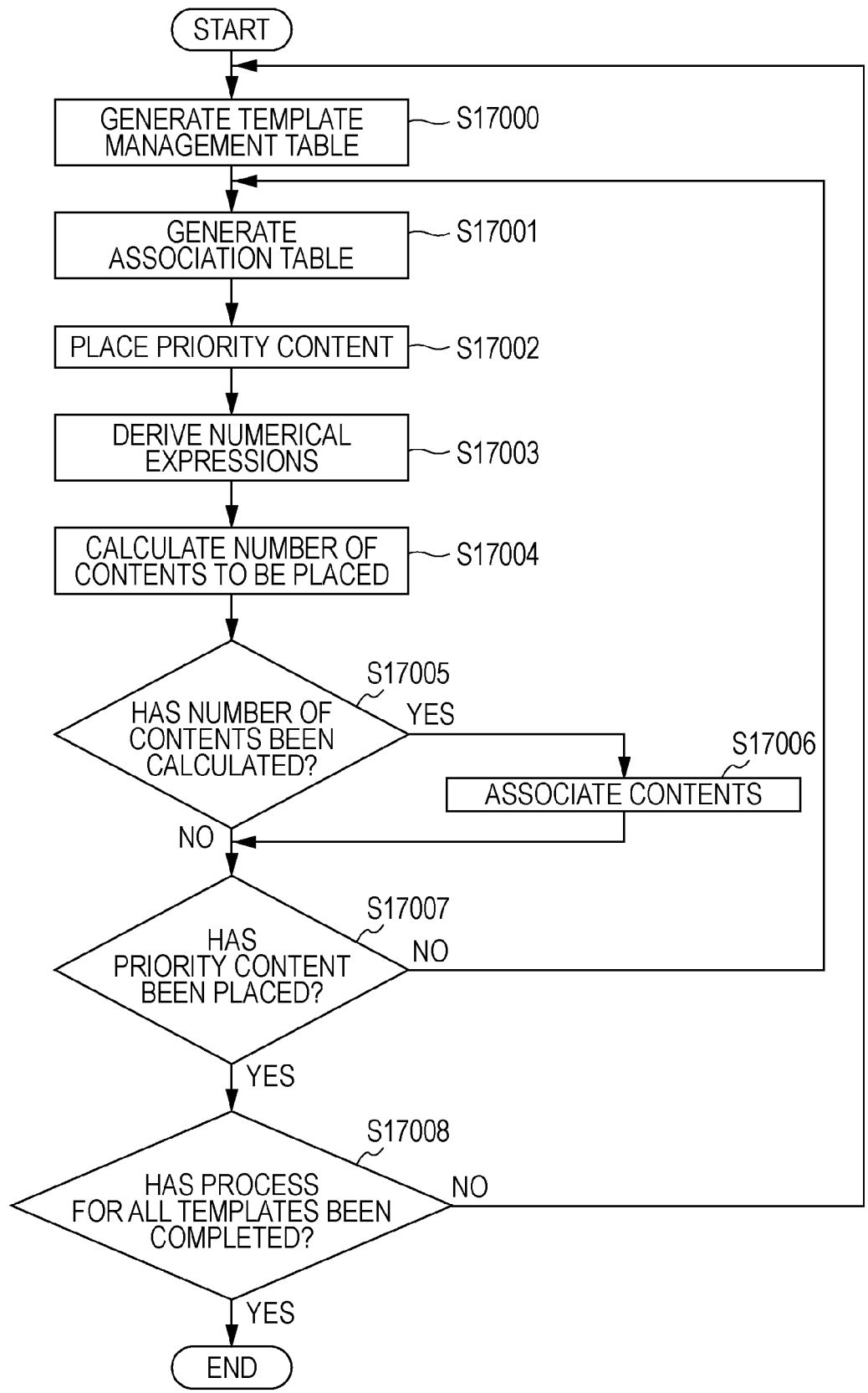
FIG. 17 is a flowchart showing the process of associating a template and contents according to the embodiment of the present invention.

FIG. 17 is a flowchart showing the process of associating a template and contents in this embodiment.

In step S17000, the content associating unit 405 generates a template management table to manage information on a selected template. The selected template is the template selected in step S5002 in FIG. 5.

As shown in FIG. 21, the template management table lists template ID 2101, association table ID 2102, and process end flag 2103. The template ID 2102 is a numeral that identifies a template, with which access to the template is obtained. The association table ID 2102 is an ID that specifies a table on which a combination of a template and corresponding content data is defined. The association table ID 2102 will be described with reference to FIG. 18. The process end flag 2103 is a flag indicating completion of generation of an association table for the template.

In step S17001, the content associating unit 405 specifies a target template with reference to the template management table generated in step S17000. The content associating unit 405 selects a template whose process end flag is not valid with reference to the template ID in ascending order and generates an association table for managing association of the content placement regions in the template with the content data on the basis of the selected template. As shown in FIG. 18, the association table includes table ID 1801, region No. 1802, and corresponding content No. 1803. The table ID 1801 is an ID for identifying a generated association table. The region No. 1802 is used to specify the content placement regions in the template and to indicate the correspondence between the content placement regions and the contents. The corresponding content No. 1803 indicates the numbers of the contents placed in the content placement regions. The content No. is associated with the content No. on the content data table, which allows access to the corresponding content using the corresponding content No. The content data table will be described later with reference to FIG. 20.

In step S17002, the content associating unit 405 selects one of the content placement regions in the template and places a priority content in the selected content placement region. The selection of the content placement region is made on the basis of priority-content placement information. The priority-content placement information has an initial value 1, , which is changed by a later process. In the case where the value of the priority-content placement information is 1, a region in which the priority content is to be placed is a region whose region No. on the association table is 1. In the case where the value of the priority-content placement information becomes 2 by a later process, the priority content is placed in the content placement region of region No. 2 on the association table.

Figure 22:
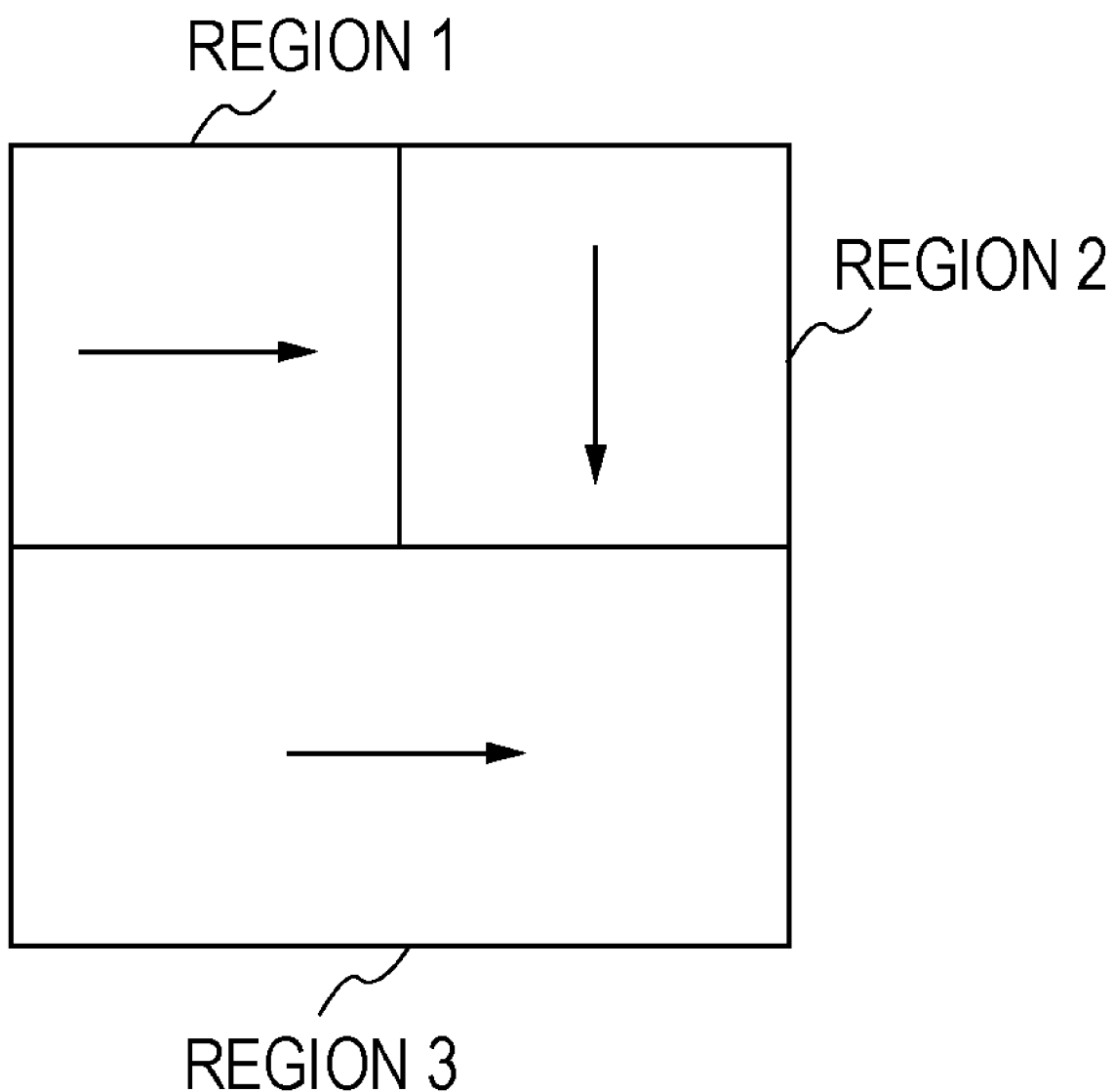
FIG. 22 is a diagram showing an example of a template according to the embodiment of the present invention.

The result of the placement of the priority content is described in the association table. For example, in the case of the template shown in FIG. 22, the association table is generated as shown in FIG. 18. Contents to be placed in the template in FIG. 22 are nine items of data shown in FIG. 23, and the priority attribute indicating that it is placed with priority is set to content No. 1 (content 2301).

In placement of contents, in the case where the value of the priority-content placement information is 1, , content No. 1 (in the example in FIG. 23, the content 2301) to which the priority attribute is set is entered as a corresponding content No. placed in the region No. 1 (FIG. 24).

In step S17003, the content associating unit 405 derives conditions (numerical expressions) for the priority content to be displayed larger than the other contents (contents to which the priority attribute is not set).

Specifically, the content associating unit 405 derives conditions for determining which content data is to be placed in which content placement region so that the priority content is displayed larger than the other contents (contents to which the priority attribute is not set). For example, in the case where one priority content is placed in a content placement region 1, the content associating unit 405 mathematically expresses how many contents should be placed in content placement regions 2 and 3 to maximize the size of the priority content placed in the content placement region 1.

Figure 23:
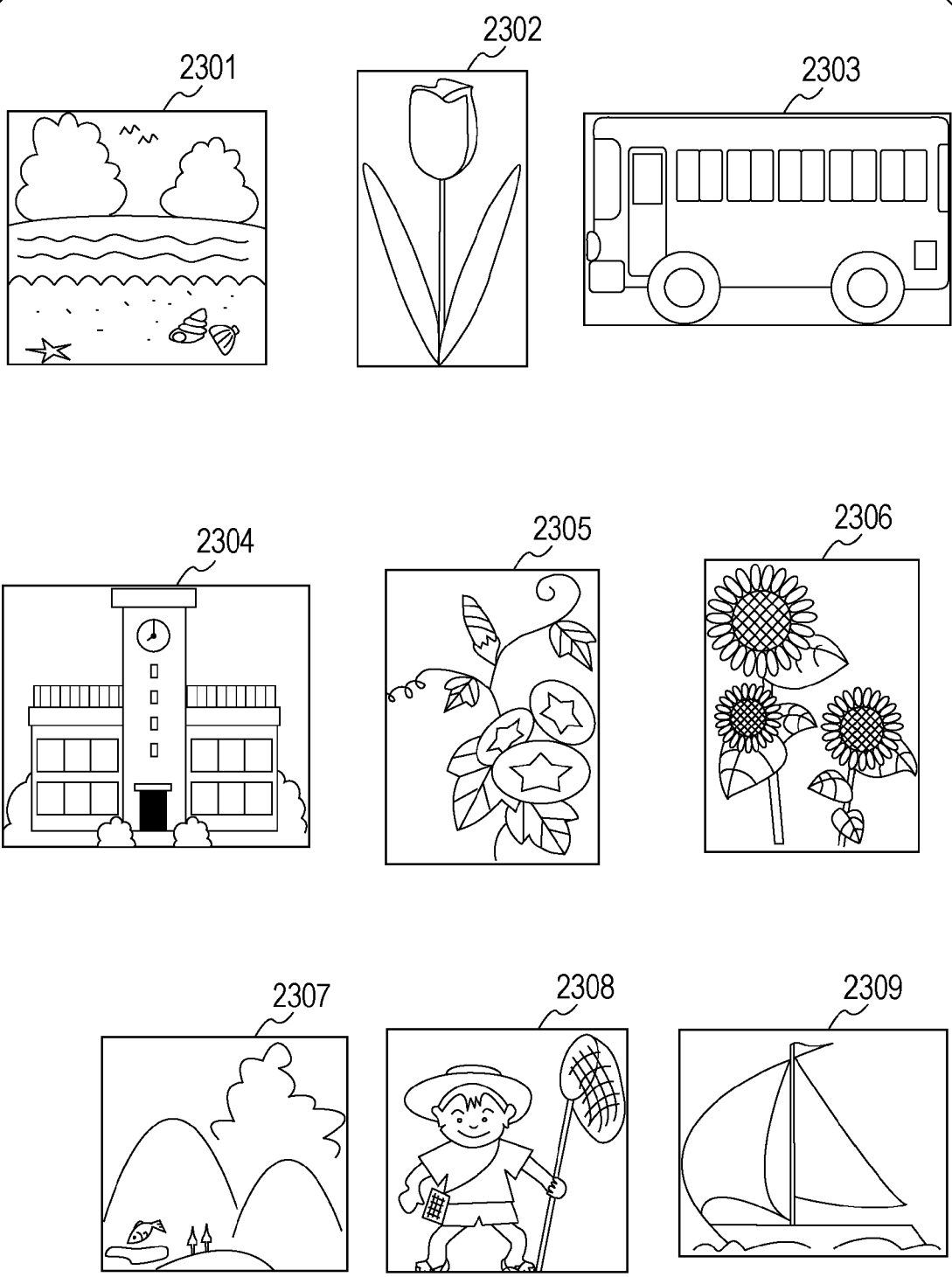
FIG. 23 is a diagram showing examples of content data according to the embodiment of the present invention.

The process of deriving the numerical expressions (conditions) will be described taking an example in which contents 2301 to 2309 shown in FIG. 23 are placed in the template shown in FIG. 22. First, the priority content is placed in the content placement region 1.

Subsequently, it is determined whether the priority content can be displayed large with reference to the content placement directions of the content placement regions in which no priority content is placed. As a result of the determination, if it is determined that the priority content can be displayed large, conditions for displaying the priority content larger than the other contents are mathematically expressed. In contrast, if it is determined that the priority content cannot be displayed large, information indicating that mathematization is of no use is defined. In the case where the content placement direction of a content placement region in which no priority content is placed is vertical, this determination method determines whether a content placement region in which a priority content is placed is present on the right or left of the content placement region. On the other hand, if the content placement direction of the content placement region in which no priority content is placed is lateral, this determination method determines whether a content placement region in which a priority content is placed is present on or under the content placement region. If this determination is No, it is determined that the priority content cannot be displayed large. A concrete example will be described with reference to FIG. 22. The content placement direction of the content placement region 2 in which no priority content is placed is vertical, and the content placement region 1 in which the priority content is placed is present on the left of the content placement region 2. That is, as the content placement region 2 expands by placing contents in the content placement region 2, the content placement region 1 in which the priority content is placed is expanded. Such a case corresponds to the case in which the priority content can be displayed large.

Subsequently, mathematization of the conditions will be described taking an example.

Since the content placement direction of the content placement region 2 is vertical, if contents more than that for the content placement region 1 are placed in the content placement region 2, the sizes of the contents in the region 2 may become smaller than that placed in the region 1. Since one content is placed in the content placement region 1, the number of the contents placed in the content placement region 2 can be expressed as, 1<(the number of contents in the region 2) . . . Ex. (1).

Next, consider the content placement region 3. The width of the content placement region 3 is equal to the sum of the widths of the region 1 and the region 2. That is, the widths of the content placement regions 1 and 2 influence on the size of the content placement region 3. The content placement region 1 has only one priority content. On the other hand, the content placement region 2 should have a plurality of contents, but the width of the region 2 is not influenced by the number of the contents (since the content placement direction of the region 2 is vertical, the lateral size does not influence on the number of the contents). This shows that the content placement region 3 is influenced by the two content placement regions 1 and 2 and does not depend on the number of the contents in the content placement region 2. That is, the content placement region 3 is influenced by the number of content placement regions. Thus, it can be expressed as 2<(the number of contents in the content placement region 3) . . . Ex. (2).

The number of contents to be placed in the template is nine, as shown in FIG. 23. Since it is decided that one content is to be placed in the content placement region 1, the number of contents to be placed in the content placement regions 2 and 3 are eight. This derives (the number of contents in the content placement region 2)+(the number of contents in the content placement region 3)=8 . . . Ex. (3).

In step S17004, the content associating unit 405 calculates the numbers of contents to be placed in the individual content placement regions from the expressions derived in step S17003.

The relation, 1<(the number of contents in the region 2)<6, and the relation, 2<(the number of contents in the region 3)<7, can be derived from the expressions (1), (2), and (3) exemplified in step S17003.

In step S17005, the content associating unit 405 determines whether the numbers of contents could be calculated in step S17004. A case in which the number of contents could not be calculated corresponds to a case in which information indicating that mathematization is of no use is defined in step S17003.

In step S17006, the content associating unit 405 determines contents to be placed in the individual content placement regions on the basis of the numbers of contents calculated in step S17004. Content data to be placed in the individual content placement regions is associated at random using a random-number generating algorithm. Here, the contents are placed under the constraints to the numbers of contents to be placed in the individual content placement regions. Information on the associated contents is stored in the association table.

Figure 26:
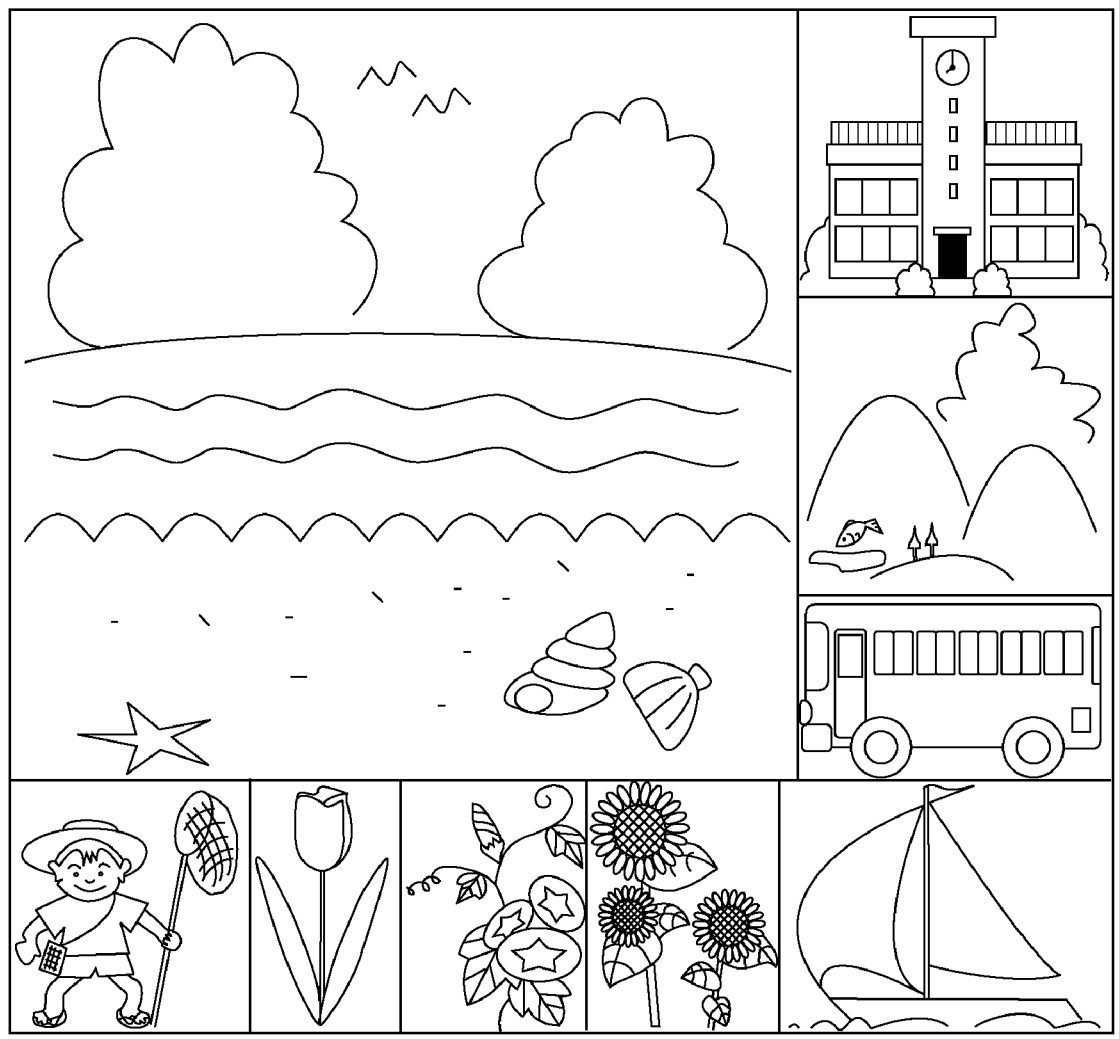
FIG. 26 is a diagram showing an example of a layout result according to the embodiment of the present invention.

By the process in step S17006, an association table, as shown in FIG. 25, is generated. While the layout process itself will be described later, the layout result of FIG. 25 will be shown in FIG. 26 for the purpose of explanation. As can be seen in FIG. 26, the content given the priority attribute is displayed large.

Although this embodiment adopts random association using random-number generation, a method of association in order of content No. may be used. Furthermore, all patterns conforming to the constraints on the numbers of contents may be generated.

In step S17007, the content associating unit 405 makes a determination for all the content placement regions whether the priority content has been placed using the priority-content placement information. This determination is made by comparing the value of the priority-content placement information and the maximum value of the region Nos. on the association table. If the value of the priority-content placement information and the maximum value of the region Nos. on the association table are equal, the content associating unit 405 determines that the determination whether the priority content has been placed was made for all the content placement regions and moves to step S17008. If the content associating unit 405 determines that no priority content is placed in all the content placement regions, value 1 is added to the priority-content placement information and returns to step S17000.

In step S17008, the content associating unit 405 determines whether the process on all the templates defined on the template management table has been completed. If the process has been completed on all the templates, the process is terminated. If the process has not been completed on all the templates, the value of the priority-content placement information is initialized to 1, and the process end flags of the target templates are made valid, and the process returns to step S17000. Here, the process end flags are on the template management table.

The foregoing content associating process is terminated when the number of associated contents cannot be calculated. If it cannot be calculated, the content placement direction of the template may be changed. By changing the content placement direction of the template, the expressions generated in step S17003 can be changed to cope therewith.

Figure 27:
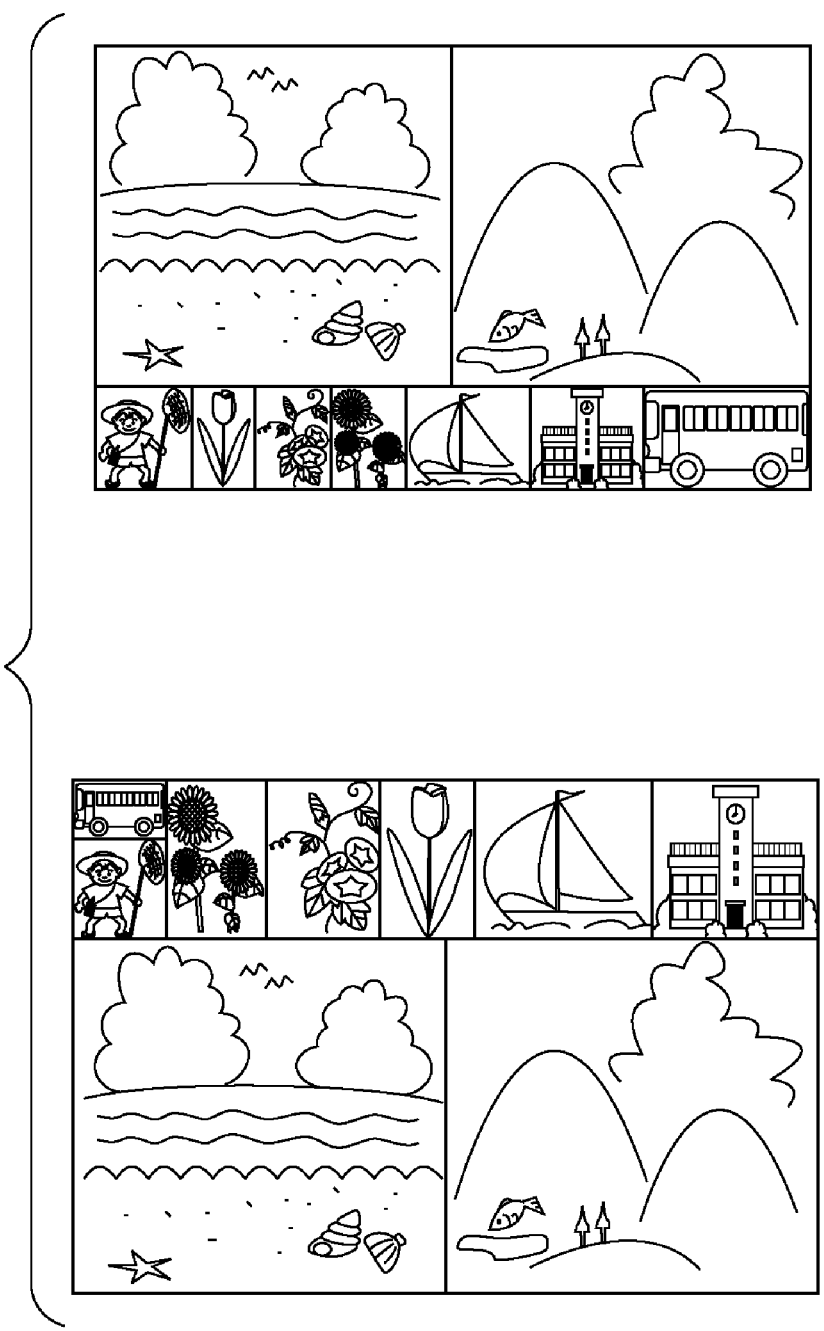
FIG. 27 is a diagram showing examples of a layout result according to the embodiment of the present invention.

Although the description in the foregoing process flow shows an example in which one priority content is given a priority attribute, there is no problem even in a plurality of contents are given the priority attribute. In the case where two contents are given the priority attribute, the layout process can be achieved by placing the two priority contents one for each content placement region. FIG. 27 shows examples of the layout result in the case where the number of contents given the priority attribute is increased to two in the example shown in the foregoing process flow.

FIG. 19 is a diagram showing an example of the template table of this embodiment. As shown in FIG. 19, the template table includes number-of-content 1901 and template ID 1902 and defines the relationship between the number of contents and templates. For example, in FIG. 19, in the case where the number of contents is 1, templates in which a priority content can be displayed larger than the other contents are templates having template IDs 1, 3, 4, 10, . . . .

FIG. 20 is a diagram showing an example of the content data table of this embodiment. The content data table includes content No. 2001, content width 2002, content height 2003, content attribute 2004, and path 2005 to actual content data on the system. The content No. 2001 is a unique numeral for identifying content data. The content width 2002 and height 2003 express the width and height of content data in pixels. The priority attribute 2004 indicates content-placement priority-attribute information, which is set to 1 for setting a priority attribute, and 0 for setting no priority attribute.

As has been described above, this embodiment allows the size of a content given a priority attribute to be displayed larger than that of a content given no priority attribute even if contents and templates are not associated with each other in advance.

Thus, the priority attribute can be utilized even if it is difficult to associate contents with a large number of templates in advance as in the layout process shown in this embodiment.

Users can know a layout in which a content given a priority attribute is displayed large by performing a layout process on all patterns. However, this process significantly increases the processing load. This embodiment can make the most of the priority attribute while minimizing the processing load.

While this embodiment has been described when applied to the case of a large number of templates, the present invention can also be applied to automatic template generation. By automatically generating a template according to the combination of fundamental template information to associate contents with the generated template, the layout process that utilizes the priority attribute can be achieved.

While this embodiment uses the number of contents to select a template, another method may be adopted. For example, the present invention can also adopt a method of analyzing contents and selecting a template on the basis of the analysis.

While this embodiment permits a plurality of contents to be placed in a content placement region of a template, there may be the constraint that only one content may be placed in each content placement region.

Figure 28:
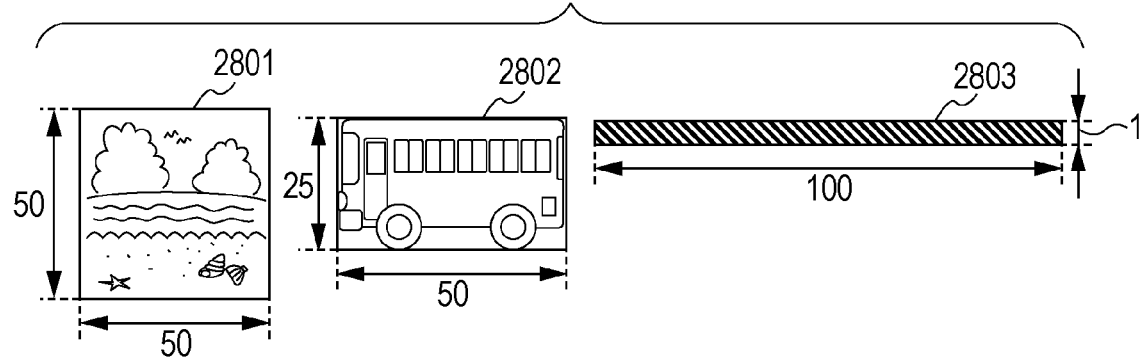
FIG. 28 is a diagram showing examples of contents according to the embodiment of the present invention.
Figure 29:
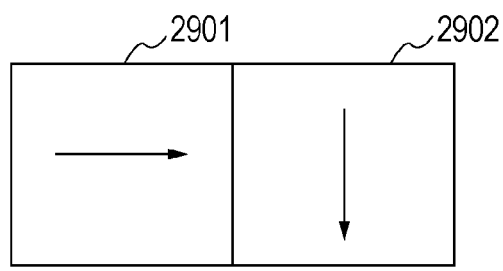
FIG. 29 is a diagram showing an example of a template according to the embodiment of the present invention.
Figure 30:
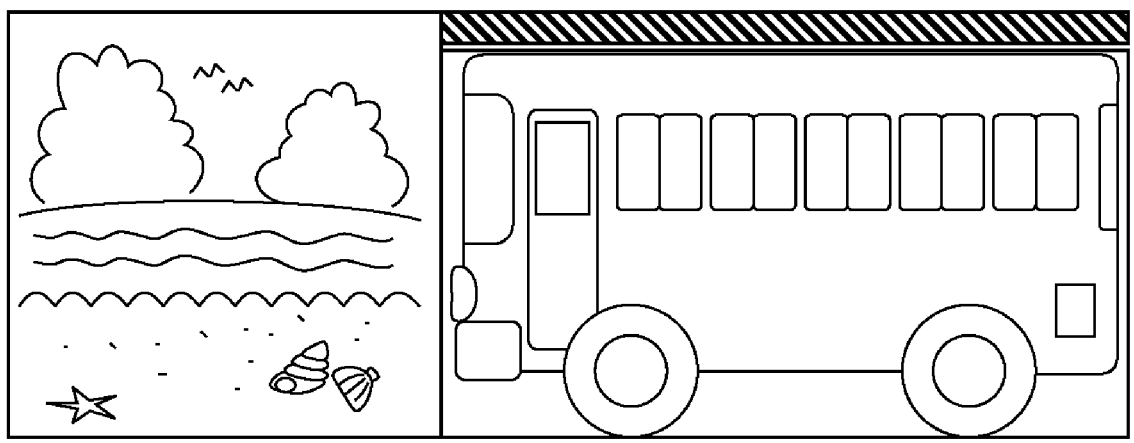
FIG. 30 is a diagram showing an example of a layout result according to the embodiment of the present invention.

Meanwhile, when the process in FIG. 17 is applied when contents 2801 to 2803 (the priority content is denoted by 2801) shown in FIG. 28 are associated with the template in FIG. 29, the result shown in FIG. 30 can be given. FIG. 30 shows a processing result when the priority content 2801 is associated with a content placement region 2901. The content 2801 is 50 long by 50 wide, the content 2802 is 25 long by 50 wide, and the content 2803 is 1 long by 100 wide.

The result in FIG. 30 shows that the other content 2802 is larger than the priority content 2801, so that a desired result is not given. This is caused by the excessive difference between the length and width of the content 2802. To prevent such a problem, if it is determined that among contents associated with a template, a content whose difference between the length and the width does not meet extraction conditions (for example, the difference between the length and the width is 50 or greater) is present, the process in FIG. 17 is not executed but an error process is executed. A concrete example of the error process is displaying an error message indicating that the priority content cannot be output in a size larger than the other contents.

Alternatively, if the priority content cannot be increased in size than the contents given no priority attribute, part of the content having a large difference between the length and the width is deleted. The layout process may be executed so that the size of the priority content becomes the maximum by this process.

After executing the process of step S17006 in FIG. 17, the content associating unit 405 determines whether the priority content is larger than the other contents, in which if it is determined to be larger, the process moves to step S17007. In contrast, if the content associating unit 405 determines that the priority content is smaller than the other contents, this layout process is cancelled and returns to step S17000.

While the present application has been described using an example of placing contents more than content placement regions, the number of content placement regions and the number of contents may be equal.

Even if templates and contents are not associated with each other, the present invention allows a content given a high priority level to be displayed large.

The present invention can be achieved also by executing the process below. That is, software (program) for achieving the functions of the above-described embodiment is supplied to a system or apparatus over a network or various storage media, and the computer (or CPU, MPU, etc.) of the system or apparatus reads the program and executes it. In this case, the program and the storage media that store the program constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-239441 filed Sep. 18, 2008, which is hereby incorporated by reference herein in its entirety.

What is claimed is:

1. A method for executing a layout process, the method comprising;
    a first defining step of defining a template having a plurality of content placement regions in which contents are placed;
    a second defining step of defining a placement direction of contents for the content placement region;
    a setting step of setting at least one content a priority attribute indicating that the content is larger in size than the other contents;
    a first selecting step of selecting one content placement region in which the plurality of other contents to which the priority attribute is not set are to be placed from the plurality of content placement regions;

a first placing step of placing the plurality of other contents in the one content placement region selected in the first selecting step wherein the plurality of other contents are placed, in the placement direction defined for the one content placement region;

a second selecting step of selecting a priority-content placement region different from the content placement region selected in the first selecting step;

a second placing step of placing the priority content in the priority-content placement region selected in the second selecting step;

a determining step of determining whether a content having an aspect ratio that satisfies extraction conditions is present in the plurality of contents; and a notifying step of providing, if it is determined in the determining step that a content having an aspect ratio that satisfies the extraction conditions is present, a message indicating that the priority content is not displayed larger than the other contents.

2. The method for executing the layout process according to claim 1, wherein when the priority attribute is set on a plurality of contents in the setting step, in the second selecting step, content placement regions in which the plurality of priority contents are to be placed are selected so that the plurality of contents have the same size and are displayed larger than the other contents.

3. The method for executing the layout process according to claim 1, further comprising:
a display control step of displaying a plurality of layout results in which the priority content and the other contents are placed in the content placement regions in the first and second placing steps; and
a selecting step of selecting a layout result from the plurality of layout results.

4. A layout processing apparatus comprising:
at least one processor coupled via a bus to a memory, the processor being programmed to control one or more of:
a first defining unit configured to define a template having a plurality of content placement regions in which contents are placed;
a second defining unit configured to define a placement direction of contents for the content placement region;
a setting unit configured to set at least one content a priority attribute indicating that the content is larger in size than the other contents;
a first selection unit configured to select one content placement region in which the plurality of other contents to which the priority attribute is not set are to be placed from the plurality of content placement regions;
a first placing unit configured to place the plurality of other contents in the one content placement region selected in the first selecting step wherein the plurality of other contents are placed, in the placement direction defined for the one content placement region;
a second selection unit configured to select a priority-content placement region different from the content placement region selected in the first selecting step;
a second placing unit configured to place the priority content in the priority-content placement region selected in the second selecting step;
a determining unit configured to determine whether a content having an aspect ratio that satisfies extraction conditions is present in the plurality of contents; and
a notifying unit configured to provide, if it is determined by the determining unit that a content having an aspect ratio that satisfies the extraction conditions is present, a message indicating that the priority content is not displayed larger than the other contents.

5. The layout processing apparatus according to claim 4, wherein
when the priority attribute is set on a plurality of contents by the setting unit, the second selection unit selects content placement regions in which the plurality of priority contents are to be placed so that the plurality of contents have the same size and are displayed larger than the other contents.

6. The layout processing apparatus according to claim 4, the processor being further programmed to control:
a display control unit configured to display a plurality of layout results in which the priority content and the other contents are placed in the content placement regions by the first and second placing units; and
a selecting unit configured to select a layout result from the plurality of layout results.

7. A non-transitory storage medium that stores a program for executing a layout process wherein the program comprising program codes for;
a first defining step of defining a template having a plurality of content placement regions in which contents are placed;
a second defining step of defining a placement direction of contents for the content placement region;
a setting step of setting at least one content a priority attribute indicating that the content is larger in size than the other contents;
a first selecting step of selecting one content placement region in which the plurality of other contents to which the priority attribute is not set are to be placed from the plurality of content placement regions;
a first placing step of placing the plurality of other contents in the one content placement region selected in the first selecting step wherein the plurality of other contents are placed, in the placement direction defined for the one content placement region;
a second selecting step of selecting a priority-content placement region different from the content placement region selected in the first selecting step;
a second placing step of placing the priority content in the priority-content placement region selected in the second selecting step;
a determining step of determining whether a content having an aspect ratio that satisfies extraction conditions is present in the plurality of contents; and
a notifying step of providing, if it is determined in the determining step that a content having an aspect ratio that satisfies the extraction conditions is present, a message indicating that the priority content is not displayed larger than the other contents.

8. The non-transitory storage medium according to claim 7, wherein when the priority attribute is set on a plurality of contents in the setting step, in the second selecting step, content placement regions in which the plurality of priority contents are to be placed are selected so that the plurality of contents have the same size and are displayed larger than the other contents.

9. The non-transitory storage medium according to claim 7, wherein the program further comprises a program code for a display control step of displaying a plurality of layout results in which the priority content and the other contents are placed in the content placement regions in the first and second placing steps; and
a selecting step of selecting a layout result from the plurality of layout results.

* * * * *